March 18, 1952     V. H. HURT     2,589,390
VULCANIZING UNIT
Filed March 21, 1947     2 SHEETS—SHEET 2
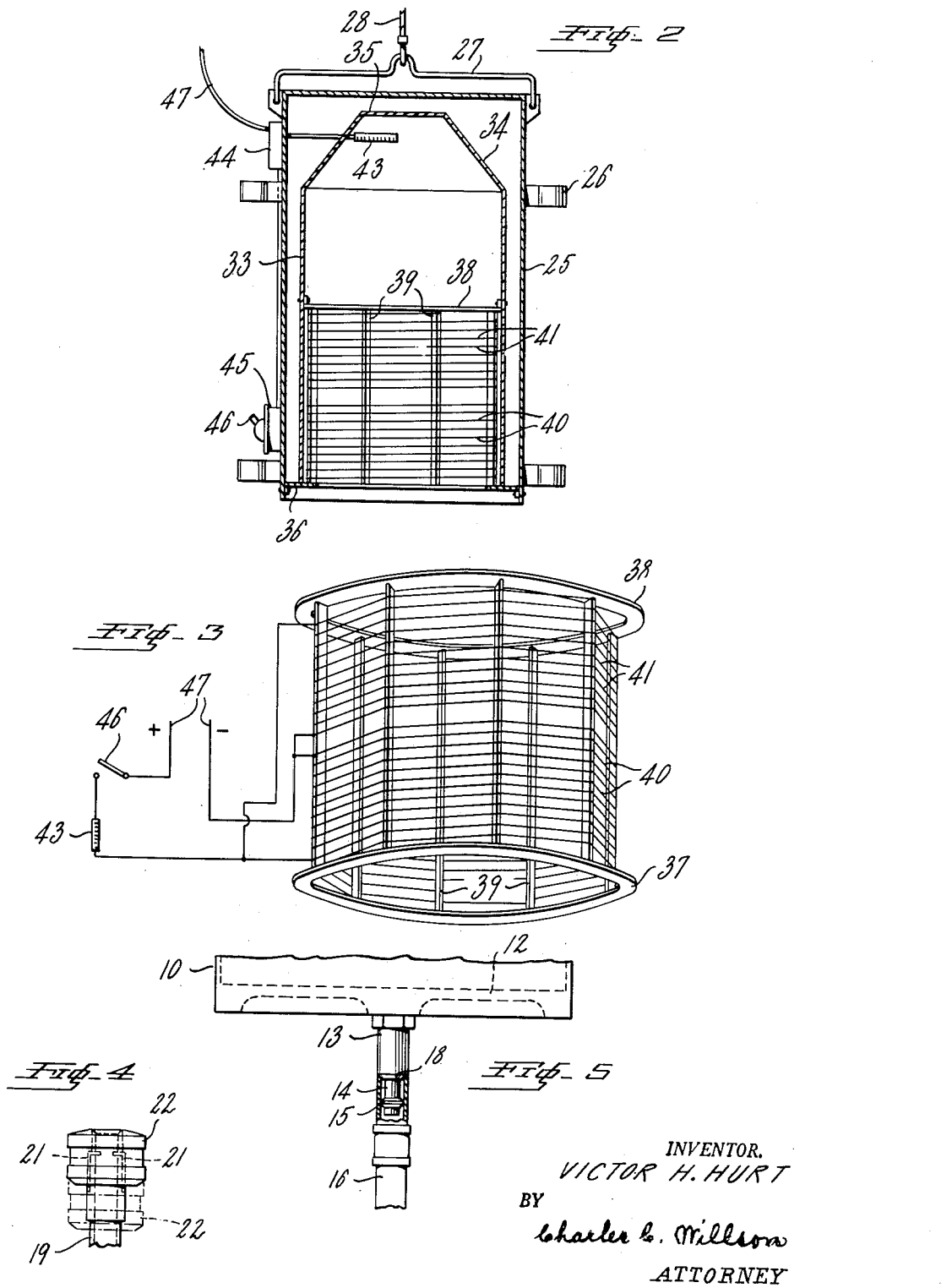
INVENTOR.
VICTOR H. HURT
BY
Charles E. Willson
ATTORNEY Patented Mar. 18, 1952

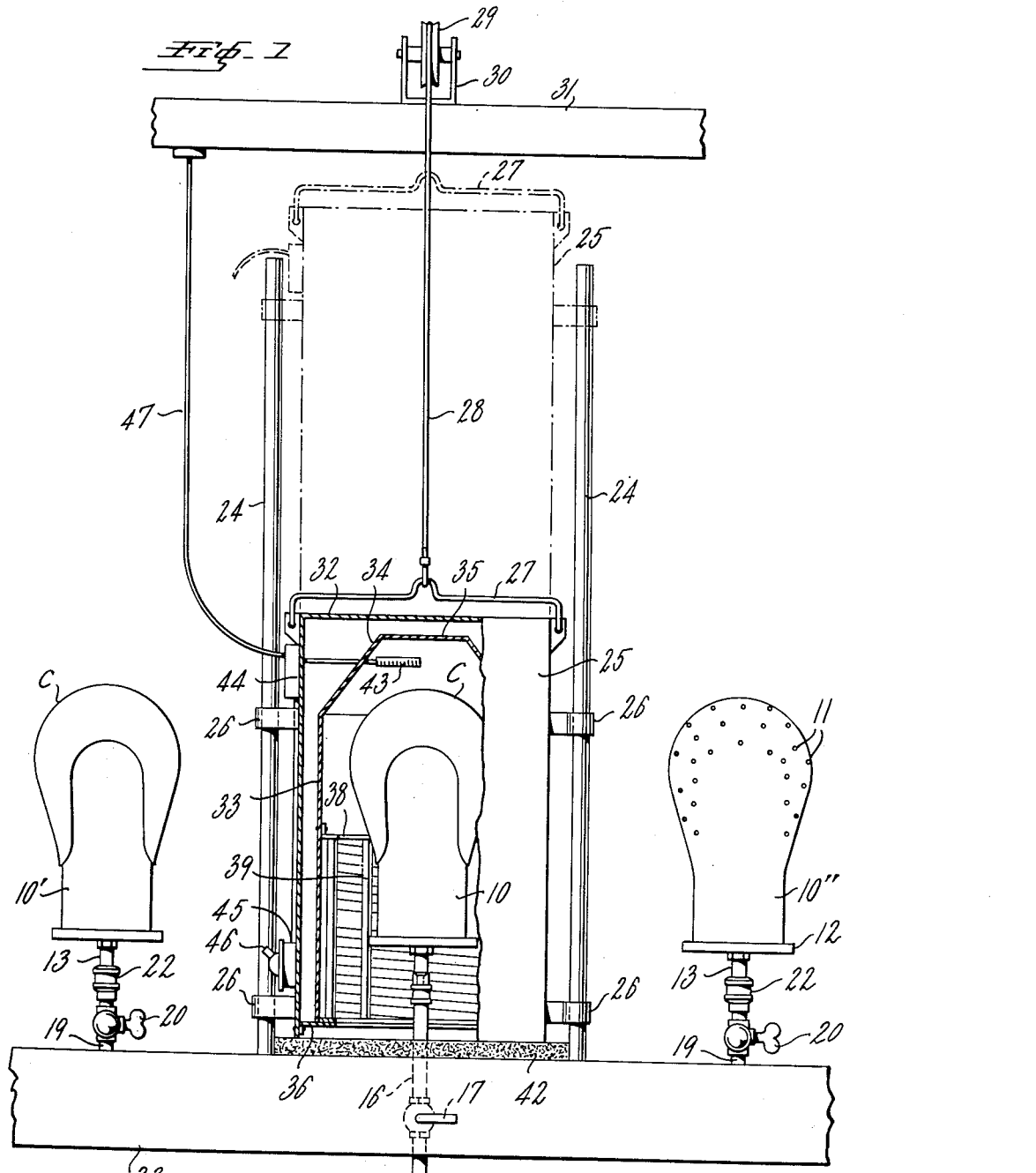

2,589,390

UNITED STATES PATENT OFFICE 2,589,390

VULCANIZING UNIT

Victor H. Hurt, Cranston, R. I., assignor to United States Rubber Company, New York, N. Y., a corporation of New Jersey Application March 21, 1947, Serial No. 736,227

3 Claims. (Cl. 18—6)

This invention relates to a vulcanizing unit including a casing containing heating means, and supported for movement into and out of housing relation with a rounded sheet rubber article to be vulcanized.

Sheet rubber articles such as bathing caps, gloves, boots, shoes, etc. have been commonly vulcanized heretofore by, first placing or building up the articles on specially shaped forms adapted to impart the desired shape to the finished vulcanized rubber article, then the forms with the vulcanizable rubber articles thereon where placed on a large rack capable of supporting a number of these forms. Such rack was then moved into a large vulcanizing chamber having a door adapted to be tightly closed during the vulcanizing period. These vulcanizers which are large and take up considerable floor space are commonly heated by coils of steam pipes placed inside of the heating chamber.

I have departed from this prior practice of vulcanizing a large number of sheet rubber articles simultaneously in a heated vulcanizing chamber, and in place thereof employed a number of small vulcanizing units each constructed to receive a single rounded form having mounted thereon a cap, glove or other article to be vulcanized.

When the large vulcanizer of the prior art above described is used to vulcanize simultaneously a number of articles, considerable time is required to raise the temperature of the heavy metal vulcanizer to the vulcanizing temperature. Also every portion of each article will be subjected to substantially the same temperature, whereas it may be desirable to subject one portion of an article to a higher temperature during the curing operation than some other portion thereof.

One advantage of the vulcanizing unit contemplated by the present invention resides in the fact that it may be constructed to meet exactly the vulcanizing requirements of a particular sheet rubber article, such for example as a bathing cap, in which it may be desirable to subject the rim portion of the cap to one temperature during the cure and the crown portion thereof to a different temperature. Another advantage of the vulcanizing unit contemplated by the present invention resides in the fact that it may be made relatively small and of thin sheet metal so that it will be light in weight and can be easily and quickly heated. Another advantage of the present vulcanizing unit resides in the construction whereby radiant heat is employed to effect the cure, and particularly to the arrangement whereby one portion of the rubber article is heated by direct radiant heat from a source of such heat, and at the same time another portion of the article is heated by reflected radiant heat from such source. Through the use of radiant heat the vulcanizing temperature is reached very quickly.

Further advantages of the present invention are secured by the construction whereby the form for the article to be vulcanized is supported above a fixed base plate during the curing period, and a vulcanizing casing having mounted therein the means for supplying the radiant heat is lowered over the object to be cured into contact with the base plate to close the casing during the curing period, and then the casing can be moved upwardly entirely clear of the vulcanized article when the latter is to be removed from the vulcanizing position and another vulcanizable article is to be substituted in its place.

The above and other advantages of the construction of the present invention and novel combination of parts will be further understood from the following description when read in connection with the accompanying drawings, wherein;

Fig. 1 is a front elevation with parts in section of a complete vulcanizing unit constructed in accordance with the present invention.

Fig. 2 is a vertical sectional view through the vulcanizing casing of Fig. 1, the means for supplying radiant heat being shown in side elevation in the lower portion of the casing.

Fig. 3 is a perspective view of electrical means for supplying radiant heat inside of the casing of Fig. 2.

Fig. 4 is a side view of locking means for retaining a vulcanizing form upon an auxiliary support, and Fig. 5 is a side view with parts in section of means for supporting a vulcanizing form within the vulcanizing unit.

The size and shape of a vulcanizing unit constructed in accordance with the present invention will vary in accordance with the size and shape of the particular article that is to be vulcanized in such unit, and while the vulcanizing unit of the present invention may be employed to vulcanize various sheet rubber articles it is particularly well adapted for use in vulcanizing bathing caps. The drawings therefore show a bathing cap vulcanizing unit.

In Fig. 1 of the drawing three bathing cap vulcanizing forms designated 10, 10', and 10" are shown. Two of these forms are provided with a bathing cap C. These forms are preferably made hollow and are provided with small apertures 11 provided in the portion of the rounded form which is to be covered by the cap C, so that the cap may be held in close contact with the contour of the form by suction or partial vacuum throughout the curing period, substantially as shown and described in my Patent No. 2,354,916.

The base portion of each form 10, 10' and 10" has the shape of a round disc 12, best shown in Fig. 5 and this disc has a short pipe or tube 13 extending downwardly from its central portion and adapted to support the form in an upright position. The pipe 13 near its lower end is reduced in diameter as at 14 and this reduced portion has the outwardly projecting annular rib 15 for a purpose to be described. The construction is preferably such that when the form 10 is in the vulcanizing position in which it is shown in Fig. 1 it is supported by the upwardly extending pipe 16 that is connected to vacuum producing means not shown, and this pipe has a hand operated valve 17 whereby its connection to the vacuum means may be opened or closed. The upper end of this pipe 16 is preferably provided with the annular bevel shown in Fig. 5 so that the correspondingly beveled shoulder 18 provided upon the pipe 13 may serve to provide an airtight joint between the pipes, while the enlargement 15 fits snugly within the bore of the pipe 16 to prevent the form 10 from rocking with respect to its supporting pipe 16. By employing the form supporting means shown in Fig. 5, a form 10 with a cap C thereon may be easily and quickly moved into its vulcanizing position, since all that is necessary is to introduce the end portion of the pipe 14 within the bore of the pipe 16 and then lower the form 10 so that it will rest by gravity upon the upper end of pipe 16.

In order that a cap C to be vulcanized may be placed on a form while the latter is adjacent the vulcanizing unit, and after the cap has been vulcanized may be removed from the form adjacent such unit, it is desirable to provide what may be called auxiliary stations such as shown in Fig. 1 at each side of the vulcanizer. One of these stations supports the form 10' and the other the form 10''. Each of these forms is supported by an upright pipe 19 preferably connected to vacuum means, and each of these pipes may be provided with a butterfly valve 20 for controlling the connection to the vacuum means. Either of the auxiliary stations shown in Fig. 1 may be employed to support a form while an unvulcanized cap is being placed on the form, or while a vulcanized cap is being stripped off the form. When a cap is stripped off a form the upward pull which the operator exerts upon the cap to remove it from the form may tend to lift the form up off its supporting pipe 19. In order to prevent the form from rising at this time the reduced portion 14 of the form supporting pipe has the shoulder 15 of Fig. 5, and each form supporting pipe 19 is preferably provided at its upper end with a beveled seat to receive the shoulder 18, and with the locking means best shown in Fig. 4 and comprising a pair of spring fingers 21 secured to the pipe 19 and adapted to engage above the shoulder 15. The arrangement is such that when a sliding collar 22 provided on the upper portion of the pipe 19 is in its raised position in which it is shown in full lines in Fig. 4 it will hold the fingers 21 in locking engagement with the shoulder 15, but when this collar is moved downwardly to the dotted line position of Fig. 4 it will release these fingers 21 so that the form may be moved upwardly out of engagement with the supporting pipe 19.

The vacuum producing pipes 16 and 19 preferably extend upwardly through a work bench or table 23. This work bench has extending upwardly therefrom the guide posts 24 adapted to guide the vulcanizing casing 25 as it is moved vertically into and out of the cap vulcanizing position. This casing 25 is shown as elevated in Fig. 1 in dot and dash lines. Lugs 26 secured to the opposite sides of the casing 25 and which embraces the uprights 24 serve to guide the casing throughout its sliding movement. The weight of the casing 25 is preferably counter-balanced by providing at its upper end the cross bar 27 to which the cable 28 is secured and this cable passes upwardly around a grooved pulley 29 which is rotatably supported by the bracket 30 that rests upon a beam 31. The other end of the cable 28 is secured to a counter-weight not shown.

The vulcanizing casing 25 is conveniently formed of thin sheet metal and has cylindrical side walls, a flat top wall 32, and an open lower end. The inner walls of such casing may be covered with heat insulating material, but in the construction shown good insulation to prevent the loss of heat is secured by providing inside of the casing 25 a somewhat similar shaped sheet metal casing. This inner casing, which serves as a heat reflector, has the cylindrical side walls 33, frusto-conical upper end 34, and top 35, and the lower end of this inner casing is secured to a supporting ring 36 that is rigidly secured to the outer casing adjacent its lower end. This retains the inner casing concentrically within the outer casing as shown in Figs. 1 and 2 and provides an air insulating space between the two metal casings.

The vulcanizing unit so far described is preferably supplied with radiant heat to cure the cap C, and such radiant heat is preferably produced by electrical means such for example as the squirrel cage heating means best shown in Fig. 3. This heating means comprises a metal frame formed of the lower ring 37, upper ring 38, and the upright bars 39 extending therebetween. These bars are provided with an electrically insulated outer surface. About the lower portion of the squirrel cage thus produced are wound a number of turns of the heating element 40, and about the upper portion of this squirrel cage are wound a number of turns of a second heating element 41. This squirrel cage frame is rigidly secured to the ring 36 as shown in Fig. 2, and the central opening of this frame is large enough to clear the form 10 and cap C thereon so that no portion of the vulcanizing casing will touch the cap as the casing 25 is raised or lowered. When this casing 25 is lowered to its vulcanizing position in which it is shown in Fig. 1 its lower open end will rest upon the padding material 42 formed of resin treated asbestos fibers or other yielding material having good heat insulating properties.

The squirrel cage heating element, it will be noted, surrounds only the lower portion of the form 10 and lower edge portion of the cap C. Therefore when the heating coils 40 and 41 are supplied with an operating current the radiant heat produced by these coils will pass upwardly to heat the lower portion of the cap, but the direct radiant heat waves do not reach the crown portion of the cap. This difficulty is overcome by so constructing the upper portions 34 and 35 of the inner casing that they will serve as a reflector adapted to reflect the direct rays from the heating element downwardly against the crown of the cap C to heat this portion of the cap. In order that the inner face of this inner casing 33, 34 and 35 will form a good radiant heat reflector it should be made of smooth and highly polished metal.

It is found in practice that the radiant heating means shown will heat the air surrounding the cap C to a considerable degree, and that if the temperature of this air is controlled, the rate at which the cap is being cured by radiant heat can be satisfactorily controlled. Therefore it is found desirable to provide a thermostat 43 inside of such casing above the cap C and provide it with an outwardly projecting stem connected to a thermostatically controlled switch box 44. This switch box is connected by wires to the lower switch box 45 having a hand switch 46. Operating current is supplied by wires 47 leading downwardly from the beam 31 to the box 44. It is preferable to provide the squirrel cage above described with the two separate and distinct heating coils 40 and 41 in order that the lower heating coil 40 may be maintained at a slightly higher temperature than the upper heating coil 41 to take care of the heat losses at the lower end of the casing 25 where it contacts the pad 42, and by conduction caused by the pipe 16. The thermostat 43 by cutting the heating current on and off gives satisfactory temperature control.

When employing the apparatus shown in Fig. 1 of the drawing to vulcanize sheet rubber articles such as bathing caps, it is found convenient to support a form such as 10' at an auxiliary station while the unvulcanized sheet rubber which is to produce the cap is being placed upon the form, and it is also desirable at this time to turn the valve 20 so as to produce a partial vacuum within the form in order that suction action will help to pull the sheet rubber cap against the form. It is also desirable to use vacuum action while the form 10 is in the vulcanizing position so as to hold the rubber in close contact with the surface of the form during the vulcanizing period. After the cap has been vulcanized, the vulcanizing casing 25 is raised to the dot and dash line position of Fig. 1 so that the heating means will be away from the cap, and ready access to the form 10 may be had to remove it from the vulcanizing position and place it in the position of the form 10", for example. The vulcanized cap may then be stripped from the form while the latter is prevented from being lifted up off the supporting pipe 19 by the gripping fingers 21.

It will be seen from the foregoing that the vulcanizing unit contemplated by the present invention is formed of a relatively few and comparatively inexpensive parts which are light in weight. This permits the interior of the vulcanizing casing to be quickly heated to the desired temperature, and also provides a construction whereby one portion of the article being vulcanized can be heated by radiant heat at a higher temperature than other portions thereof should this be desired. It also provides a construction whereby the form carrying the article to be vulcanized can be easily moved into and out of the vulcanizing position. Since the vulcanizing unit shown in the drawings will accommodate only one cap at a time it is contemplated that a number of these units will be provided so that one operator may attend a number of these units and change the cap in one unit while caps are being vulcanized in other units.

Having thus described my invention, what I claim and desire to protect by Letters Patent is:

1. A vulcanizing unit, comprising a rounded form for supporting and shaping a sheet rubber article, means for supporting the form while the article thereon is being vulcanized, a vulcanizing casing adapted to house the form, an electrical source of radiant heat mounted in one portion of the casing, a hollow reflector mounted in the casing and having an angularly disposed reflector portion positioned in another part of the casing from that of the source of radiant heat, and means for supporting the casing for movement into and out of housing relation with the form and so that when the casing houses the form one portion of the rubber article can be heated by the direct radiant heat from said source while another portion of the article is heated by the radiant heat produced by said source but reflected against the article by the reflector.

2. A vulcanizing unit, comprising a rounded form for supporting and shaping a sheet rubber article, a fixed base plate having means associated therewith for supporting the form while the article thereon is being vulcanized, a vulcanizing casing adapted to house the form and mounted for vertical movement into and out of engagement with said base plate so that the casing is closed by engaging the base plate, an electrical source of radiant heat mounted in one portion of the casing, and a hollow reflector mounted in the casing and having an angularly disposed reflector portion in another part of the casing from that of the source of radiant heat and positioned so that when the casing engages the base plate one portion of the rubber article will be heated by radiant heat from said source and another portion will be heated by radiant heat produced by said source but reflected against the article by the reflector.

3. A vulcanizing unit, comprising a rounded form for supporting and shaping a rubber cap, a fixed base plate having means associated therewith to support the form, a vulcanizing casing mounted for downward movement into closing contact relation with the base plate during the vulcanizing operation and upward movement entirely clear of the form when the latter is to be removed from said supporting means, an electrical source of radiant heat mounted in the lower portion of the casing so that radiant heat therefrom will strike the side portions of the cap, and a hollow reflector mounted in the casing and having an angularly disposed reflector portion positioned in another part of the casing from that of the source of radiant heat and adapted to reflect radiant heat waves from said source against the top of the cap.

VICTOR H. HURT.

REFERENCES CITED

The following references are of record in the file of this patent:

UNITED STATES PATENTS

| Number | Name | Date |
| --- | --- | --- |
| 1,199,420 | Randall | Sept. 26, 1916 |
| 1,416,527 | Townsend | May 16, 1922 |
| 1,504,108 | Elspass | Aug. 5, 1924 |
| 1,683,740 | Tavender | Sept. 11, 1928 |
| 1,829,018 | Schade | Oct. 27, 1931 |
| 2,035,092 | Nielsen et al. | Mar. 24, 1936 |

FOREIGN PATENTS

| Number | Country | Date |
| --- | --- | --- |
| 42,719 | Sweden | Sept. 30, 1915 |